(12) United States Patent
Kinoshita

(10) Patent No.: US 8,504,298 B2
(45) Date of Patent: Aug. 6, 2013

(54) FACILITY-AROUND-ROUTE RETRIEVAL DEVICE

(75) Inventor: Hidetoshi Kinoshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 13/320,622

(22) PCT Filed: Jul. 8, 2009

(86) PCT No.: PCT/JP2009/003188
§ 371 (c)(1),
(2), (4) Date: Nov. 15, 2011

(87) PCT Pub. No.: WO2011/004434
PCT Pub. Date: Jan. 13, 2011

(65) Prior Publication Data
US 2012/0072113 A1 Mar. 22, 2012

(51) Int. Cl.
*G06F 19/00* (2011.01)

(52) U.S. Cl.
USPC ........... 701/533; 701/23; 701/25; 701/409; 701/410; 701/411; 701/426; 701/428; 701/431; 701/437; 701/438; 701/454; 701/455; 701/457; 701/465; 701/532; 340/439; 340/457; 340/988; 340/990; 340/995.1; 340/995.2; 340/995.11; 340/995.14; 340/995.15; 340/995.19; 340/995.23; 340/995.24; 342/457; 345/581

(58) Field of Classification Search
USPC ............ 701/23, 25, 409, 410, 411, 428, 426, 701/431, 437, 438, 454, 455, 457, 465, 532, 701/533; 340/439, 576, 988, 990, 995.1, 340/995.2, 995.11, 995.14, 995.15, 995.19, 340/955.23, 995.24; 342/457; 73/178 R; 345/581
See application file for complete search history.

(56) References Cited

U.S. PATENT DOCUMENTS

| | | | | |
|---|---|---|---|---|
| 4,825,362 | A * | 4/1989 | Minami et al. | 709/233 |
| 6,427,118 | B1 | 7/2002 | Suzuki | |
| 7,432,959 | B2 * | 10/2008 | Ueda | 348/221.1 |
| 7,523,237 | B2 * | 4/2009 | Gerig | 710/105 |
| 8,234,060 | B2 * | 7/2012 | Uotani et al. | 701/533 |
| 2005/0216188 | A1 | 9/2005 | Sumizawa et al. | |
| 2007/0083303 | A1 * | 4/2007 | O'Sullivan et al. | 701/29 |

(Continued)

FOREIGN PATENT DOCUMENTS

| | | |
|---|---|---|
| JP | 10-030931 A | 2/1998 |
| JP | 10-030932 A | 2/1998 |

(Continued)

*Primary Examiner* — James Trammell
*Assistant Examiner* — McDieunel Marc
(74) *Attorney, Agent, or Firm* — Birch, Stewart, Kolasch & Birch, LLP

(57) ABSTRACT

A facility-around-route retrieval device includes a map disk 3 for storing map data and facility data, a route calculation unit 13 for calculating a route to a destination by using the map data stored in the map disk, a facility retrieval condition setting unit 16 for setting a facility retrieval condition, and a facility-around-route retrieval unit 17 for retrieving, in a case where a facility around the route calculated in the route calculation unit is retrieved in accordance with the condition set in the facility retrieval condition setting unit, the facility present only on a side of a traveling lane of a vehicle of a divided road from the facility data stored in the map disk when the route includes the divided road.

3 Claims, 8 Drawing Sheets

(56) References Cited

U.S. PATENT DOCUMENTS

| | | | |
|---|---|---|---|
| 2010/0259374 A1* | 10/2010 | Matsuo et al. | 340/439 |
| 2010/0302974 A1* | 12/2010 | Niiyama et al. | 370/254 |
| 2011/0015857 A1* | 1/2011 | Uotani et al. | 701/201 |
| 2011/0153151 A1* | 6/2011 | Rogers et al. | 701/33 |
| 2011/0231053 A1* | 9/2011 | Kuramochi et al. | 701/29 |
| 2011/0292439 A1* | 12/2011 | Nagata et al. | 358/1.15 |

FOREIGN PATENT DOCUMENTS

| | | |
|---|---|---|
| JP | 2001-116565 A | 4/2001 |
| JP | 2004-245581 A | 9/2004 |
| JP | 2005-164543 A | 6/2005 |
| JP | 2005-274312 A | 10/2005 |
| JP | 2006-313088 A | 11/2006 |
| JP | 2008-089511 A | 4/2008 |
| JP | 2009-031077 A | 2/2009 |

* cited by examiner

FIG.6

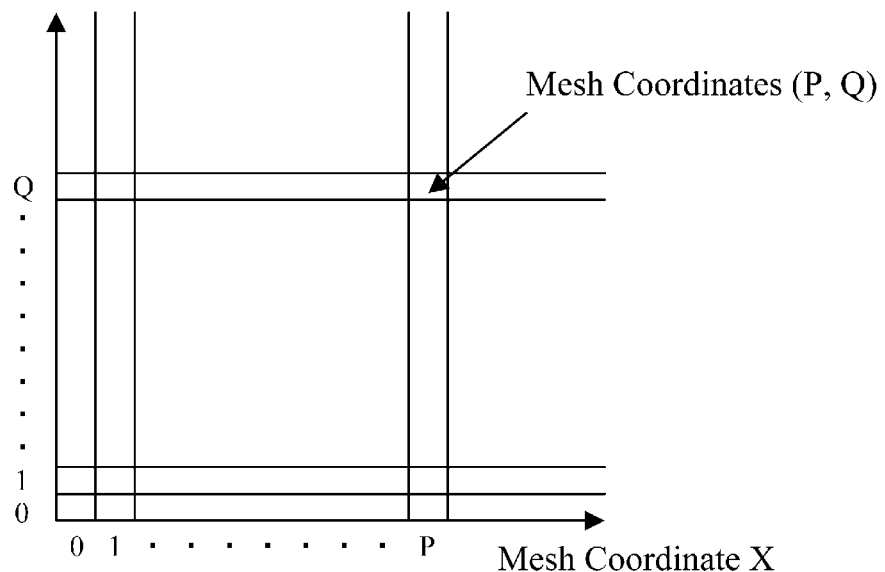

Mesh Coordinate Y

Mesh Coordinates (P, Q)

Mesh Coordinate X

FIG.7

Facility Data Address Table

| Number of Facility Genres in Mesh (r) |
| Data Address of Facility Genre #1 |
| Data Address of Facility Genre #2 |
| . . . |
| Data Address of Facility Genre #s |
| . . . |
| Data Address of Facility Genre #r |

Facility Data List

| Facility Genre Number (s) |
| Facility Genre Name |
| Number of Facility Data Items (t) |
| Facility Data Record #1 |
| Facility Data Record #2 |
| . . . |
| Facility Data Record #t |

FIG.8

Facility Data Record

| Facility Data Name |
| --- |
| Longitude |
| Latitude |

FIG.9

Route Information

| Number of Links Constituting Route (n) |
| --- |
| First Link Information |
| Second Link Information |
| ⋮ |
| i-th Link Information |
| ⋮ |
| Last Link Information |

| Mesh Coordinate X |
| --- |
| Mesh Coordinate Y |
| Link Number |
| Road Type |
| Link Length |

US 8,504,298 B2

FACILITY-AROUND-ROUTE RETRIEVAL DEVICE

TECHNICAL FIELD

The present invention relates to a facility-around-route retrieval device for retrieving a facility around a searched route.

BACKGROUND ART

Conventionally, there is known a navigation device having a "facility-around-route retrieval function" of selecting a genre such as a gas station, a convenience store, or a restaurant to retrieve a facility along a route. In facility-around-route retrieval using this function, facilities present within a range of a specific width (e.g., 50 m) on each of the left and right sides of a road constituting a route are retrieved. Consequently, the retrieval of the facility is performed irrespective of whether the retrieval range is on the left side or the right side in a travel direction. Accordingly, for example, in the case of a divided road as a road having a central reservation, there are cases where the facility present on the opposite side of the central reservation from a vehicle is retrieved and, in order to stop at the facility, the vehicle needs to pass by the facility once and make a U-turn to go to the facility so that there has been a problem that the facility is not appropriate as the facility along the route at which the vehicle stops. Note that, in addition to the above-mentioned road having the central reservation, the divided road includes a road which is displayed with one link on map data, and a road which is displayed as a road on which it is prohibited to cross its central portion.

As a relevant technology, Patent Document 1 discloses an on-vehicle navigation device which allows a user to easily recognize the position of a facility and a distance to the facility. In the on-vehicle navigation device, on the basis of data stored in a CD-ROM and a current position, a microprocessor retrieves facilities located along a road on which the current position is present and a specific road connected to the road, and calculates a distance from the current position to each of the retrieved facilities. In addition, there is created a table including the type and/or the name of each facility, a distance from the current position to the facility, and the position of the facility when viewed toward the travel direction of a vehicle, and the table is shown on a display screen.

In addition, Patent Document 2 discloses an on-vehicle navigation device which allows a user to recognize desired facilities located around a road in accordance with his or her preferences. The on-vehicle navigation device has a CD-ROM storing data on a map therein, a microprocessor for calculating the current position of a vehicle, and a display for displaying the map and the current position of the vehicle, and the microprocessor sets priorities for facilities around the road, retrieves the facilities stored in the CD-ROM in accordance with the set priorities, and displays information on the retrieved facilities on the display.

Further, Patent Document 3 discloses a navigation device configured such that routes to a plurality of facilities provided as the result of retrieval of surrounding facilities can be clearly presented to a user in consideration of traffic regulations; thus, the user can easily determine and select a facility which is best for the user. When displaying icons of one or more car parks retrieved by a surrounding facility search function on a map, the navigation device determines an access route on the basis of traffic regulation information on a road facing each car park and displays an arrow mark indicative of the route together with the car park icon, whereby it is possible to clearly present a user with information such as the most convenient car park for a vehicle to head for in terms of the position of the vehicle, the easiest car park for the vehicle to enter, and the like at a glance even in an area where a plurality of car parks are concentrated, or an area where traffic regulations such as one-way traffic and the like are intricately enforced.

PRIOR ART DOCUMENTS

Patent Documents

Patent Document 1: Japanese Patent Application Laid-open No. H10-30931
Patent Document 2: Japanese Patent Application Laid-open No. H10-30932
Patent Document 3: Japanese Patent Application Laid-open No. 2005-164543

In the above-described technology disclosed in Patent Document 1, the facility retrieved by the surrounding facility retrieval is displayed in the form of the table which identifies whether the facility is present on the left side or the right side toward the travel direction of the vehicle. However, it is not identified whether or not the road on which the vehicle is traveling is a divided road so that the facilities on both of the right side and the left side of the road are displayed. As a result, there arises a problem that the facility of easy accessibility along a route can not be easily retrieved.

In addition, in the technology disclosed in Patent Document 2, when the surrounding facility retrieval is executed, a higher priority is given to the facility on the left side when viewed from the travel direction of the vehicle. However, it is not identified whether or not the road on which the vehicle is traveling is the divided road so that the facilities on both of the right side and the left side of the road are displayed. As a result, there arises a problem similar to the above-mentioned problem.

Further, in the technology disclosed in Patent Document 3, it is determined whether or not the entry into the facility is possible. However, the determination is made based on the traffic regulation information on the road facing the facility, and it is not identified whether or not the road on which the vehicle is traveling is the divided road so that the facilities on both of the right side and the left side of the road are displayed. As a result, there arises a problem similar to the above-mentioned problem.

SUMMARY OF THE INVENTION

The present invention has been achieved in order to solve the above-described problem, and an object thereof is to provide a facility-around-route retrieval device capable of easy retrieval of a facility of easy accessibility along a route.

A facility-around-route retrieval device according to the present invention includes a map disk for storing map data and facility data, a route calculation unit for calculating a route leading to a destination by using the map data stored in the map disk, a facility retrieval condition setting unit for setting a facility retrieval condition, and a facility-around-route retrieval unit for retrieving, in a case where a facility around the route calculated in the route calculation unit is retrieved in accordance with the condition set in the facility retrieval condition setting unit, the facility present only on a side of a traveling lane of a vehicle of a divided road from the facility data stored in the map disk when the route includes the divided road, wherein the facility-around-route retrieval unit determines whether or not the route is the divided road based on a road type included in information defining a link constituting the route calculated in the route calculating unit.

According to the invention, in a case where a facility around a route is retrieved in accordance with a set condition, when the route includes a divided road, the facility present only on the side of a traveling lane of a vehicle of the divided road is retrieved, and hence it is possible to easily retrieve the facility of easy accessibility along the route.

BRIEF DESCRIPTION OF THE DRAWINGS

FIG. 6 shows an image of mesh coordinates used in the facility-around-route retrieval device of Embodiment 1 in the invention.

FIG. 7 shows facility data in each mesh of the mesh coordinates used in the facility-around-route retrieval device of Embodiment 1 in the invention.

FIG. 8 shows a facility data record included in the facility data in each mesh of the mesh coordinates used in the facility-around-route retrieval device of Embodiment 1 in the invention.

FIG. 9 shows a constitution of route information used in the facility-around-route retrieval device of Embodiment 1 in the invention.

BEST MODE FOR CARRYING OUT THE INVENTION

A detailed description is given hereinbelow of an embodiment in the present invention with reference to the drawings.
Embodiment 1

Figure 1:
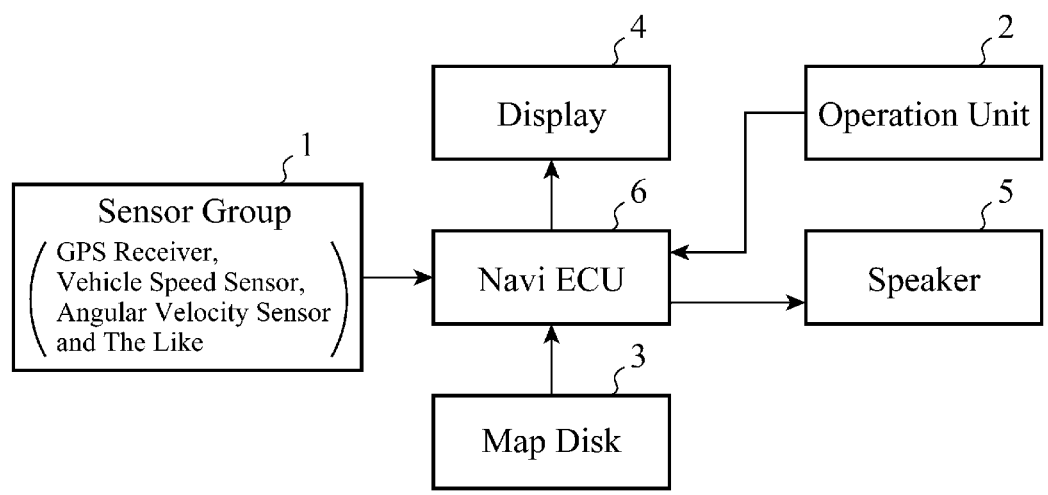
FIG. 1 is a block diagram showing a configuration of a facility-around-route retrieval device of Embodiment 1 in the present invention.

FIG. 1 is a block diagram showing a configuration of a facility-around-route retrieval device of Embodiment 1 in the present invention. The facility-around-route retrieval device is realized as a part of an on-vehicle navigation device, and has a sensor group 1, an operation unit 2, a map disk 3, a display 4, a speaker 5, and a navigation ECU (Electronic Control Unit) (hereinafter abbreviated as a "navi ECU") 6.

The sensor group 1 includes a GPS receiver, a vehicle speed sensor, and an angular velocity sensor. The GPS receiver receives a GPS signal transmitted from a GPS satellite constituting a global positioning system (GPS), and detects the current position of itself on the basis of the received GPS signal. The current position thereof detected by the GPS receiver is sent to the navi ECU 6 as GPS information.

The vehicle speed sensor detects the rotation of a wheel, and generates a vehicle speed pulse in correspondence to the rotation of the wheel. The vehicle speed pulse generated in the vehicle speed sensor is sent to the navi ECU 6 as vehicle speed pulse information. The angular velocity sensor detects a change in the travel direction of a vehicle. The change in the travel direction of the vehicle detected by the angular velocity sensor is sent to the navi ECU 6 as angular velocity sensor information.

The operation unit 2 is constituted of at least one of, e.g., a remote controller, an operational switch, a touch panel, and a voice input device, and is used to input various information items. The information inputted from the operation unit 2 is sent to the navi ECU 6 as operation information.

The map disk 3 is constituted of, e.g., an HDD (Hard Disk Drive), and stores map data and facility data. Note that the map disk 3 can be constituted of a DVD drive for reproducing information recorded in a DVD (Digital Versatile Disk). In this case, the map data and the facility data are stored in the DVD loaded in the DVD drive. The map data and the facility data stored in the map disk 3 are read by the navi ECU 6. In addition, the map disk 3 can also be constituted by storing the map data in other recording media such as a flash ROM and the like.

The display 4 is constituted of, e.g., an LCD (Liquid Crystal Display), and displays various information items such as a map, a vehicle position mark, a route to a destination, and the like in accordance with display data sent from the navi ECU 6. The speaker 5 outputs a guidance voice and the like in accordance with voice data sent from the navi ECU 6.

Figure 2:
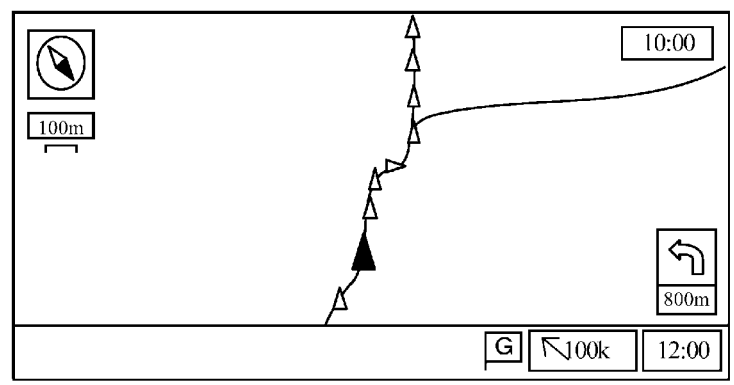
FIG. 2 shows an example of a screen shown on a display in the facility-around-route retrieval device of Embodiment 1 in the invention.

The navi ECU 6 is constituted of, e.g., a microcomputer, and controls the entire navigation device. For example, the navi ECU 6 acquires the GPS information, the vehicle speed pulse information, and the angular velocity sensor information from the sensor group 1, and calculates the current position of the vehicle on the basis of these information items. Subsequently, the navi ECU 6 calculates the current position of the vehicle on the map shown using the map data read from the map disk 3, generates the display data in which a vehicle position mark indicative of the calculated current position of the vehicle is superimposed on the map, and sends the generated display data to the display 4. With this operation, for example, an image in which the vehicle position mark (black triangle) is superimposed on the map as shown in FIG. 2 is shown on the screen of the display 4.

In addition, when the destination is selected on the map, the navi ECU 6 executes processing for guiding from the current position to the destination. In the processing, a route is displayed on the map and, when the vehicle approaches a distinctive point such as an intersection or the like during traveling on the route, a picture in which the distinctive point is enlarged is shown on the display 4 to thereby facilitate the traveling along the route . Further, the navi ECU 6 also performs guidance by voice through the speaker 5.

Figure 3:
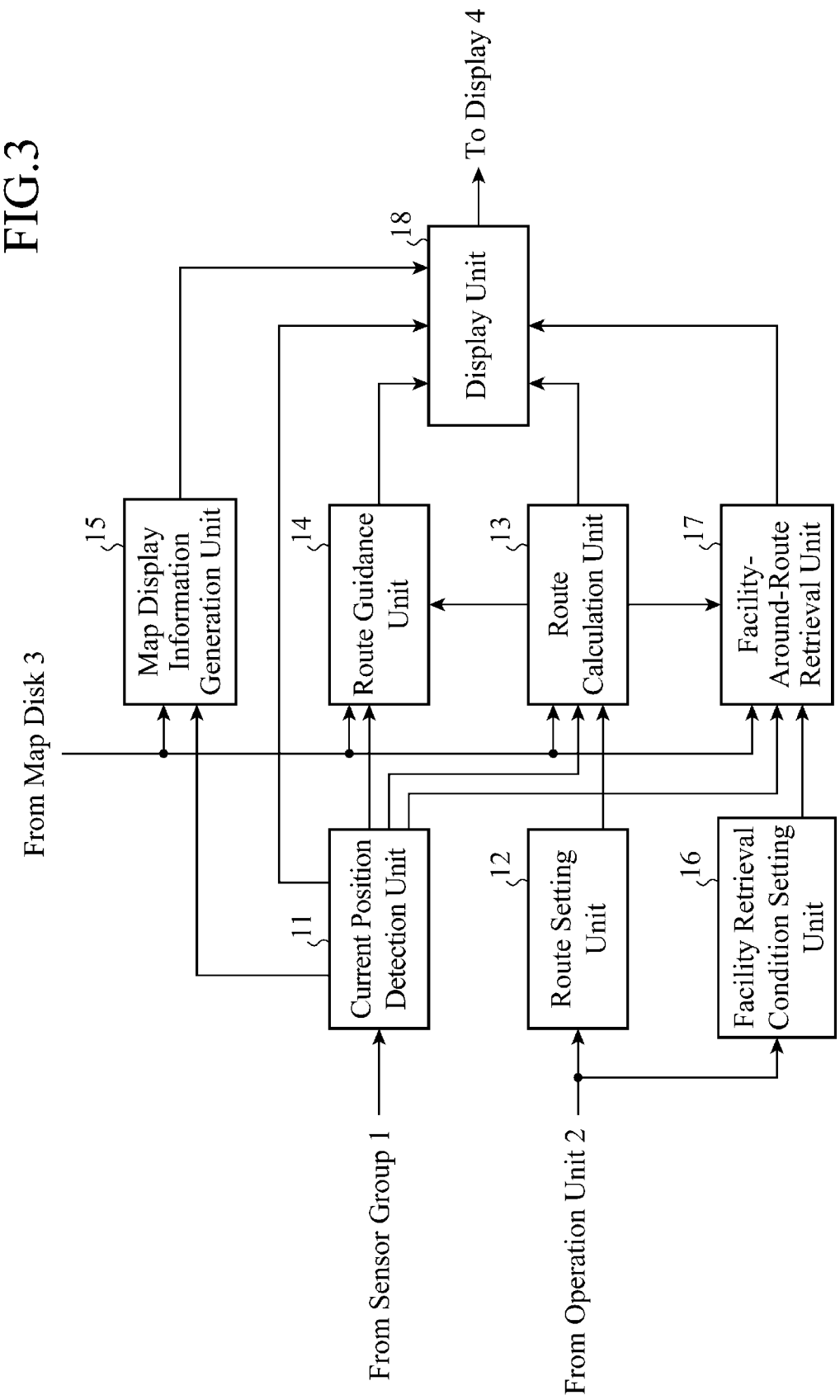
FIG. 3 is a block diagram showing a functional configuration of a navi ECU of the facility-around-route retrieval device of Embodiment 1 in the invention in detail.

FIG. 3 is a block diagram showing the functional configuration of the navi ECU 6 in detail. The navi ECU 6 has a current position detection unit 11, a route setting unit 12, a route calculation unit 13, a route guidance unit 14, a map display information generation unit 15, a facility retrieval condition setting unit 16, a facility-around-route retrieval unit 17, and a display unit 18.

The current position detection unit 11 determines the current position of the vehicle on the basis of the GPS information, the vehicle speed pulse information, and the angular velocity sensor information which are sent from the sensor group 1. The current position determined in the current position detection unit 11 is sent to the route calculation unit 13, the route guidance unit 14, the map display information generation unit 15, the facility-around-route retrieval unit 17, and the display unit 18 as current position information.

The route setting unit 12 sets a condition for route calculation such as, the destination, a stopover, and the presence or absence of a priority given to a toll road. The condition set in the route setting unit 12 is sent to the route calculation unit 13 as route calculation condition information.

The route calculation unit 13 executes the route calculation on the basis of the map data read from the map disk 3 in accordance with the current position information sent from the current position detection unit 11 and the route calculation condition information sent from the route setting unit 12. In addition, when the current position deviates from the calculated route, the route calculation unit 13 automatically executes recalculation of the route. The route calculated in the route calculation unit 13 is sent to the route guidance unit 14, the facility-around-route retrieval unit 17, and the display unit 18 as route information.

The route guidance unit 14 generates information for performing route guidance on the basis of the map data read from the map disk 3 in accordance with the current position information sent from the current position detection unit 11 and the route information sent from the route calculation unit 13, and sends the generated information to the display unit 18 as route guidance information.

The map display information generation unit 15 generates map display information of the surrounding area of the current position on the basis of the current position information sent from the current position detection unit 11 and the map data read from the map disk 3. The map display information generated in the map display information generation unit 15 is sent to the display unit 18.

Figure 4:
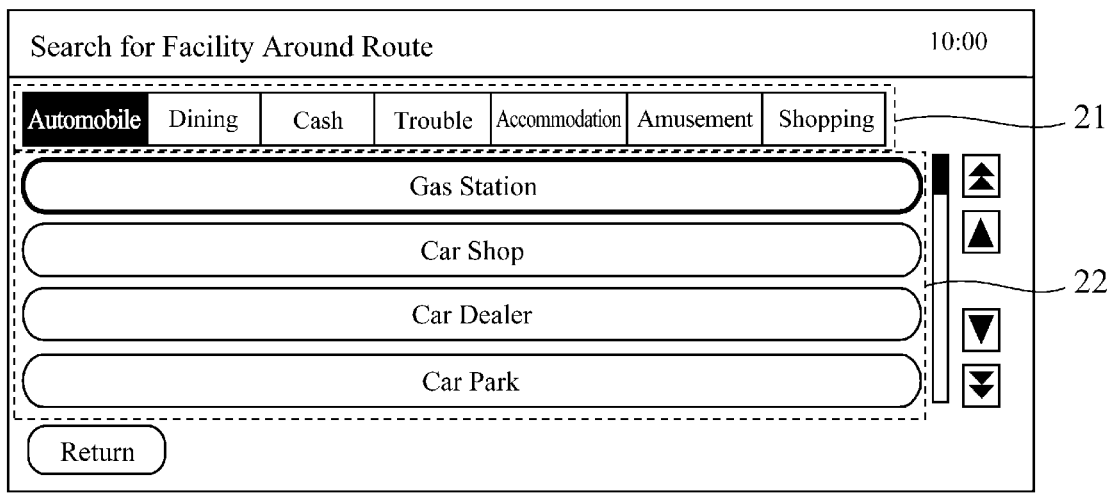
FIG. 4 shows an example of a facility retrieval condition setting screen used in the facility-around-route retrieval device of Embodiment 1 in the invention.

The facility retrieval condition setting unit 16 gives an instruction for activating facility-around-route retrieval, and also sets a facility genre in the facility retrieval. FIG. 4 shows an example of a facility retrieval condition setting screen. The facility retrieval condition setting screen has a region for selecting a facility genre group 21 and a facility genre 22. By selecting one from among a plurality of facility genre groups 21, a plurality of facility genres 22 belonging to the selected facility genre group is displayed. One facility genre selected from among the plurality of facility genres 22 serves as a facility-around-route retrieval target. The content set in the facility retrieval condition setting unit 16 is sent to the facility-around-route retrieval unit 17.

The facility-around-route retrieval unit 17 retrieves the facility along the route of the selected genre such as a gas station, a convenience store, a restaurant, or the like in accordance with the instruction from the facility retrieval condition setting unit 16. The facility retrieved in the facility-around-route retrieval unit 17 is sent to the display unit 18 as facility information.

Figure 5:
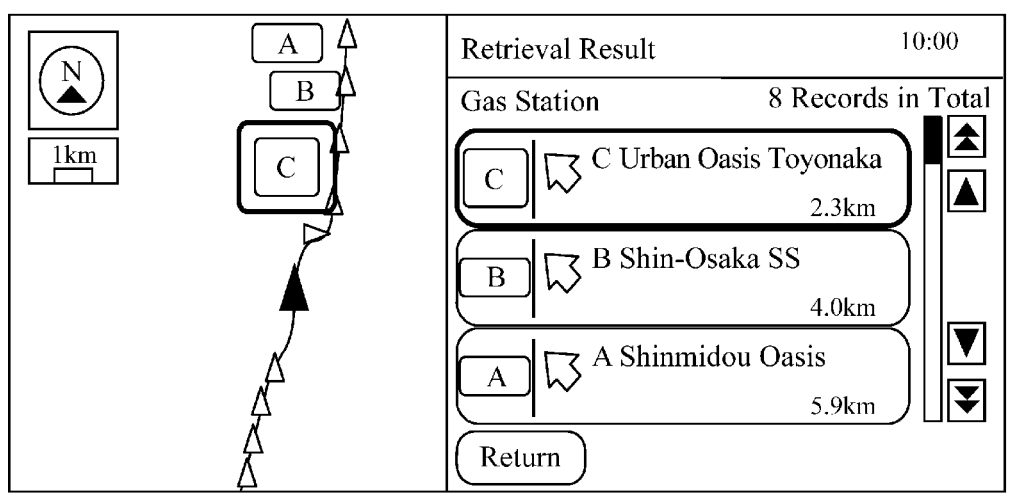
FIG. 5 shows an example of a navigation screen shown on the display in the facility-around-route retrieval device of Embodiment 1 in the invention.

The display unit 18 superimposes the current position information sent from the current position detection unit 11, the route information sent from the route calculation unit 13, the route guidance information sent from the route guidance unit 14, and the facility information and icon information sent from the facility-around-route retrieval unit 17 on the map display information sent from the map display information generation unit 15 to generate the display data, and sends the generated display data to the display 4. With this operation, for example, the navigation screen as shown in FIG. 5 is shown on the display 4.

Herein, a description is given of the form of the facility data used in the facility-around-route retrieval device of Embodiment 1. The facility data is produced on a per mesh basis, and is stored in the map disk 3 in the form of mesh coordinates. FIG. 6 shows an image of the mesh coordinates. As shown in FIG. 7, the facility data in each mesh consists of a facility data address table and a facility data list.

The facility data address table consists of the number of facility genres in the mesh (r) and a data address of the facility genre #s (s=1, 2, . . . , r). The facility data list is referred to using the data address of the facility genre #s. The facility data list consists of a facility genre number (s), a facility genre name, the number of facility data items (t), and facility data records #1 to #t. As shown in FIG. 8, each facility data record consists of a facility data name, and latitude and longitude.

Next, a description is given of the detail of the route information calculated by the route calculation unit 13. FIG. 9 shows the constitution of the route information. The route information consists of the number of links constituting the route (n), and n link information. Each link information consists of a mesh coordinate X, a mesh coordinate Y, a link number, a road type, and a link length. The road type includes information indicative of whether or not the link is a divided road.

Figure 10:
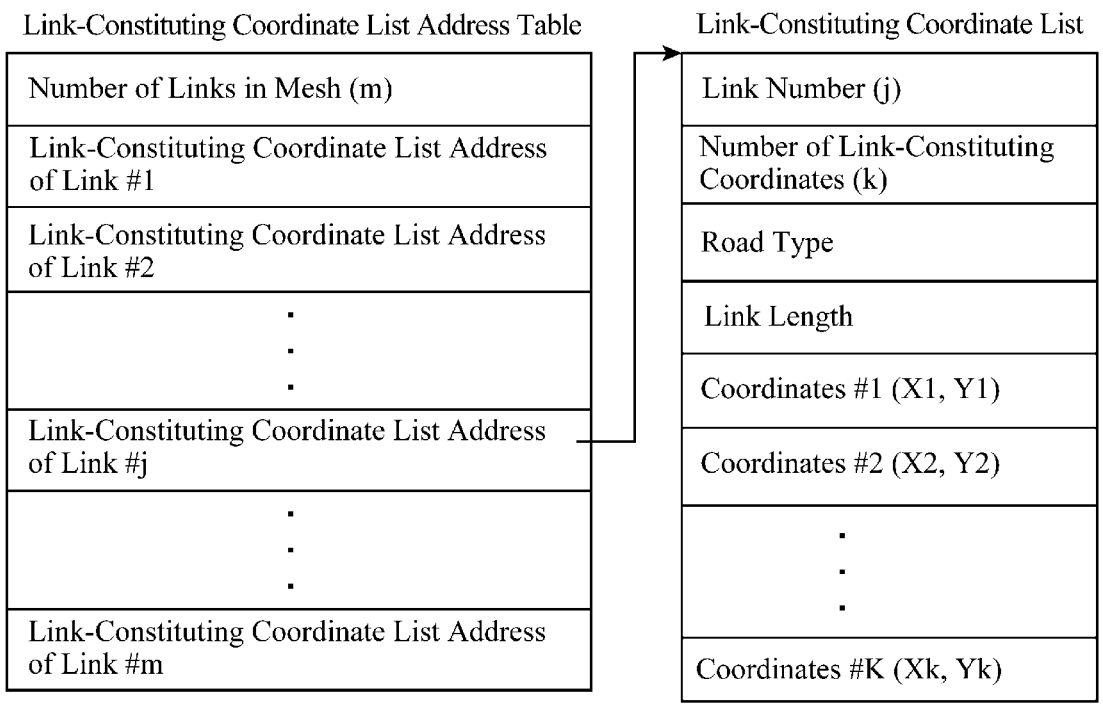
FIG. 10 shows a constitution of the route information in each mesh used in the facility-around-route retrieval device of Embodiment 1 in the invention.

As shown in FIG. 10, route information in each mesh consists of a link-constituting coordinate list address table and a link-constituting coordinate list. The link-constituting coordinate list address table consists of the number of links in the mesh (m) and a link-constituting coordinate list address of a link #j (j=1, 2, . . . , m).

The link-constituting coordinate list is referred to using the link-constituting coordinate list address of the link #j. The link-constituting coordinate list consists of the link number (j), the number of link-constituting coordinates (k), the road type, the link length, the coordinates #1 (X1, Y1) to #k (Xk, Yk). The road type is the same as that shown in FIG. 9.

Figure 12:
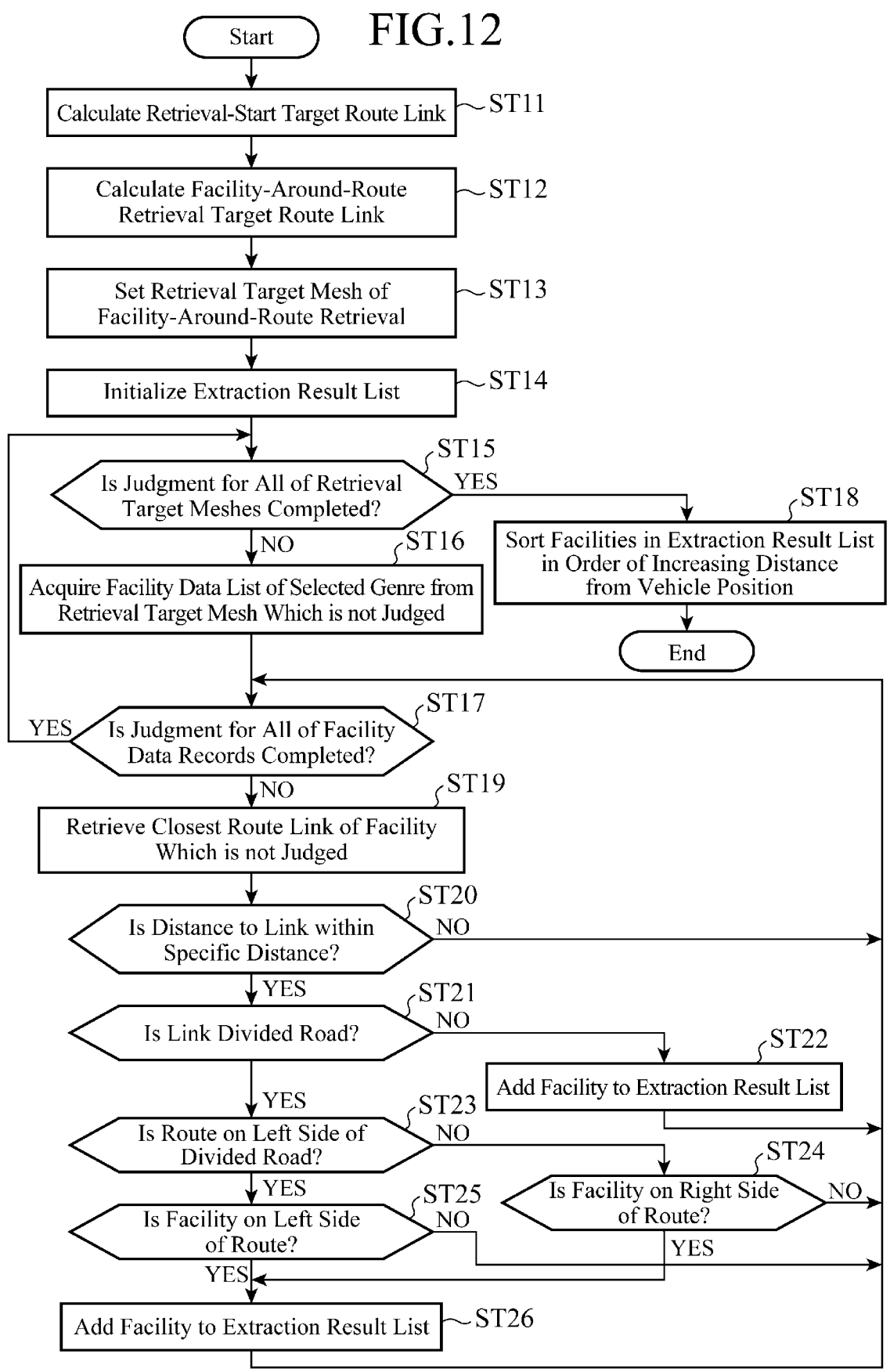
FIG. 12 is a flowchart showing operations of the facility-around-route retrieval device of Embodiment 1 in the invention with facility-around-route retrieval processing as the main operation.

Next, a description is given of operations of the thus-configured facility-around-route retrieval device of Embodiment 1 in the invention with facility-around-route retrieval processing as the main operation with reference to a flowchart shown in FIG. 12. The facility-around-route retrieval processing is started in response to the instruction from the facility retrieval condition setting unit 16, and is executed in the facility-around-route retrieval unit 17.

In the facility-around-route retrieval processing, a facility-around-route retrieval target mesh is firstly set from the current position information sent from the current position detection unit 11 and the route information sent from the route calculation unit 13. Specifically, a retrieval-start target route link is firstly calculated (Step ST11). That is, in the route information, the retrieval-start target route link is determined from the current position indicated by the current position information.

Subsequently, facility-around-route retrieval target route links are calculated (Step ST12). That is, the route ahead of the retrieval-start target route link is determined as the facility-around-route retrieval target route links. Note that, in consideration that a retrieval time is increased as the distance of the retrieval is increased, a range within a specific distance (e.g., 30 km) from the retrieval-start target route link can be set as the target. In this case, the link length of the route ahead of the retrieval-start target route link is sequentially accumulated, and links up to the one with which the specific distance is exceeded are determined as the facility-around-route retrieval target route links.

Figure 11:
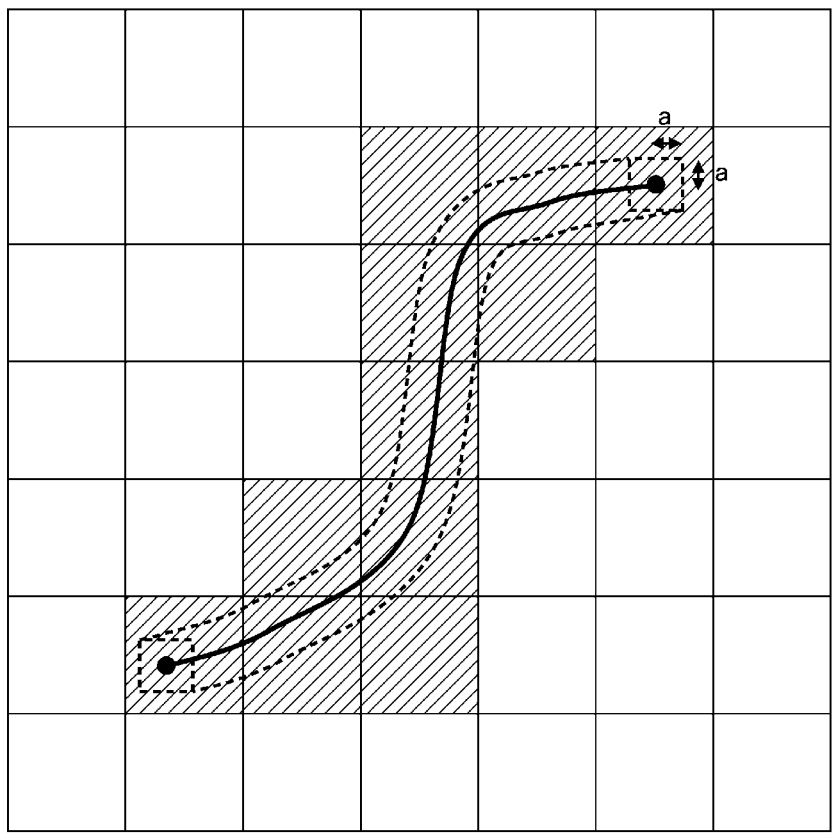
FIG. 11 shows a setting image of a facility-around-route retrieval target mesh used in the facility-around-route retrieval device of Embodiment 1 in the invention.

Then, the retrieval target mesh of the facility-around-route retrieval is set (Step ST13). That is, for all of the around-route retrieval target route links extracted in Step ST12, the link-constituting coordinate list is referred to, and the setting of the retrieval target mesh in the facility-around-route retrieval is performed. More specifically, in the facility-around-route retrieval, facilities present within a specific distance a (e.g., 50 m) on the left and right sides of the route are subjected to the retrieval, and hence the setting is performed by determining which mesh the individual coordinates in the link-constituting coordinate list belong to, and including the adjacent mesh present within the range of the distance a from the individual coordinates in longitudinal and latitudinal directions. FIG. 11 shows the setting image of the facility-around-route retrieval target mesh.

Next, an extraction result list is initialized (Step ST14). That is, the extraction result list for storing facilities extracted in the following processing is set to an initial state. Subsequently, it is examined whether or not the judgment for all of the retrieval target meshes set in Step ST13 is completed (Step ST15). In Step ST15, when it is determined that the judgment for all of the retrieval target meshes is not completed, the facility data list of the selected genre is acquired from retrieval target mesh which is not judged (Step ST16). Then, it is examined whether or not the judgment for all of the facility data records is completed (Step ST17). In Step ST17, when it is determined that the judgment for all of the facility data records is completed, the sequence returns to Step ST15, and the above-described processing is repeated.

In the process of repeated execution of Steps ST15 to ST17, in Step ST15, when it is determined that the judgment for all of the retrieval target meshes is completed, the facilities stored in the extraction result list are sorted in order of increasing distance from the vehicle position (Step ST18). Thereafter, the facility-around-route retrieval processing is ended.

In the process of repeated execution of Steps ST15 to ST17 described above, in Step ST17, when it is determined that the judgment for all of the facility data records is not completed, the closest route link of the facility which is not judged is retrieved (Step ST19). That is, in the facility data of the retrieval target mesh, the facility data list of the selected genre is referred to from the facility data address table, and the closest around-route retrieval target route link is retrieved from the longitude and latitude of each facility data record in the facility data list. At this point, in order to prevent the retrieval of the facility behind the vehicle and beyond the destination, when the position in the around-route retrieval target route link closest to the facility is at the end on the vehicle position side or on the destination side, the facility can be excluded from the facilities around the route.

Next, it is examined whether or not the distance to the closest route link retrieved in Step ST19 is within a specific distance (Step ST20). In Step ST20, when it is determined that the distance to the closest route link is not within the specific distance, the sequence returns to Step ST17, and the above-described processing is repeated.

On the other hand, in Step ST20, when it is determined that the distance to the closest route link is within the specific distance, it is examined whether or not the closest route link retrieved in Step ST19 is the divided road (Step ST21). That is, the facility-around-route retrieval unit 17 examines whether or not the road type of the link-constituting coordinate list (see FIG. 10) indicates the divided road. In Step ST21, when it is determined that the closest route link is not the divided road, the facility is added to the extraction result list (Step ST22). Thereafter, the sequence returns to Step ST17, and the above-described processing is repeated.

In Step ST21 described above, when it is determined that the closest route link is the divided road, it is examined whether or not the route is on the left side of the divided road (Step ST23). In Step ST23, when it is determined that the route is not on the left side of the divided road, it is examined whether or not the facility is on the right side of the route (a lane indicated by the route guidance) (Step ST24). In Step ST24, when it is determined that the facility is not on the right side of the route, the sequence returns to Step ST17, and the above-described processing is repeated. On the other hand, in Step ST24, when it is determined that the facility is on the right side of the route, the sequence advances to Step ST26.

In Step ST23 described above, when it is determined that the route is on the left side of the divided road, it is examined whether or not the facility is on the left side of the route (the lane indicated by the route guidance) (Step ST25). In Step ST25, when it is determined that the facility is not on the left side of the route, the sequence returns to Step ST17, and the above-described processing is repeated. On the other hand, in Step ST25, when it is determined that the facility is on the left side of the route, the sequence advances to Step ST26. In Step ST26, the facility is added to the extraction result list. Thereafter, the sequence returns to Step ST17, and the above-described processing is repeated.

With the processing described above, when the route is on the left side of the divided road and the facility is on the left side of the route, or when the route is on the right side of the divided road and the facility is on the right side of the route, the facility is registered in the extraction result list as the facility around the route.

Figure 13:
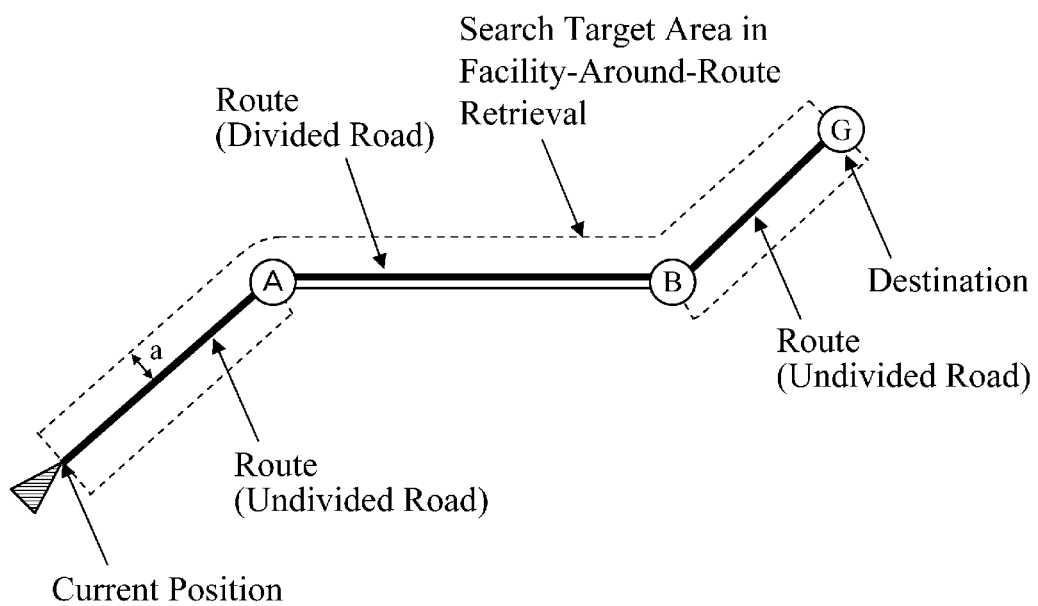
FIG. 13 shows an image of an area searched by the facility-around-route retrieval processing in the facility-around-route retrieval device of Embodiment 1 in the invention.

FIG. 13 shows an image of an area searched by the facility-around-route retrieval processing. In FIG. 13, the section from a current position to an A point, and the section from a B point to a destination correspond to the section of an undivided road, while the section from the A point to the B point corresponds to the section of the divided road. In addition, in the section of the divided road from the A point to the B point, the route extends on the left side toward the direction of the destination. Since the section from the current position to the A point and the section from the B point to the destination correspond to the section of the undivided road, facilities present within the distance a on both of the left and right sides of the route are retrieved. On the other hand, since the section from the A point to the B point corresponds to the section of the divided road and the route extends along the road on the left side, facilities present within the distance a on the left side of the route are retrieved.

As described above, according to the facility-around-route retrieval device of Embodiment 1 in the invention, when the route includes the divided road, by setting only the side of the traveling lane of the vehicle as a search target, the retrieval of the facility present on the side of a lane opposite to the traveling lane thereof is prevented on the road which does not allow an entry into the side of the lane opposite to the traveling lane thereof due to a central reservation or the like, and hence it is possible to retrieve the facility of easy accessibility along the route.

Note that, in the above-described facility-around-route retrieval device of Embodiment 1 in the invention, the facility-around-route retrieval unit 17 can be configured so as to determine whether or not the route is the divided road only when the route calculated in the route calculation unit 13 is not an expressway.

In addition, the facility-around-route retrieval unit 17 can be configured such that in the case where the facility around the route calculated in the route calculation unit 13 is retrieved, the facility present only on the side of the traveling lane of the vehicle of the divided road is retrieved from the facility data stored in the map disk 3 when the route includes the divided road, and the facility present on the side opposite to the side of the traveling lane of the vehicle of the divided road is retrieved from the facility data stored in the map disk 3 when the facility which meets the condition set in the facility retrieval condition setting unit 16 is not present within a specific distance ahead the vehicle. According to the configuration, in the event of an emergency, the facility along the lane on the opposite side, which is to be reached even by causing the traveling vehicle to make a U-turn, can be presented.

Further, in the facility-around-route retrieval device of Embodiment 1, the facility-around-route retrieval unit 17 is configured so as to automatically retrieve the facility present only on the side of the traveling lane of the vehicle of the divided road from the facility data stored in the map disk 3 when the route includes the divided road. However, the facility-around-route retrieval unit 17 can also be configured such that, by using the facility retrieval condition setting unit 16, the setting is performed so as to retrieve the facility present only on the side of the traveling lane of the vehicle of the divided road, or retrieve the facility present on both sides of the traveling route of the vehicle of the divided road.

INDUSTRIAL APPLICABILITY

The present invention can be used in an on-vehicle navigation device for retrieving and displaying a facility around a route.

The invention claimed is:

1. A facility-around-route retrieval device, comprising:
a map disk for storing map data and facility data;
a route calculation unit for calculating a route to a destination by using the map data stored in the map disk;
a facility retrieval condition setting unit for setting a facility retrieval condition; and
a facility-around-route retrieval unit for retrieving, in a case where a facility around the route calculated in the route calculation unit is retrieved in accordance with the condition set in the facility retrieval condition setting unit, the facility present only on a side of a traveling lane of a vehicle of a divided road from the facility data stored in the map disk when the route includes the divided road,
wherein the facility-around-route retrieval unit determines whether or not the route is the divided road based on a road type included in information defining a link constituting the route calculated in the route calculation unit.

2. The facility-around-route retrieval device according to claim 1, wherein the facility-around-route retrieval unit determines whether or not the route is the divided road only when the route calculated in the route calculation unit is not an express way.

3. A facility-around-route retrieval device, comprising:
a map disk for storing map data and facility data;
a route calculation unit for calculating a route to a destination by using the map data stored in the map disk;
a facility retrieval condition setting unit for setting a facility retrieval condition; and
a facility-around-route retrieval unit for retrieving, in a case where a facility around the route calculated in the route calculation unit is retrieved in accordance with the condition set in the facility retrieval condition setting unit, the facility present only on a side of a traveling lane of a vehicle of a divided road from the facility data stored in the map disk when the route includes the divided road,
wherein in a case where the facility around the route calculated in the route calculation unit is retrieved, the facility-around-route retrieval unit retrieves the facility present only on the side of the traveling lane of the vehicle of the divided road from the facility data stored in the map disk when the route includes the divided road and, when the facility which meets the condition set in the facility retrieval condition setting unit is not present within a specific distance ahead the vehicle, the facility-around-route retrieval unit retrieves the facility present on a side opposite to the side of the traveling lane of the vehicle of the divided road, from the facility data stored in the map disk.

* * * * *